Oct. 27, 1970                    Y. H. SMILEY                    3,535,921
                            CYCLICAL CONTROL APPARATUS
Filed Feb. 13, 1968                                          2 Sheets-Sheet 1
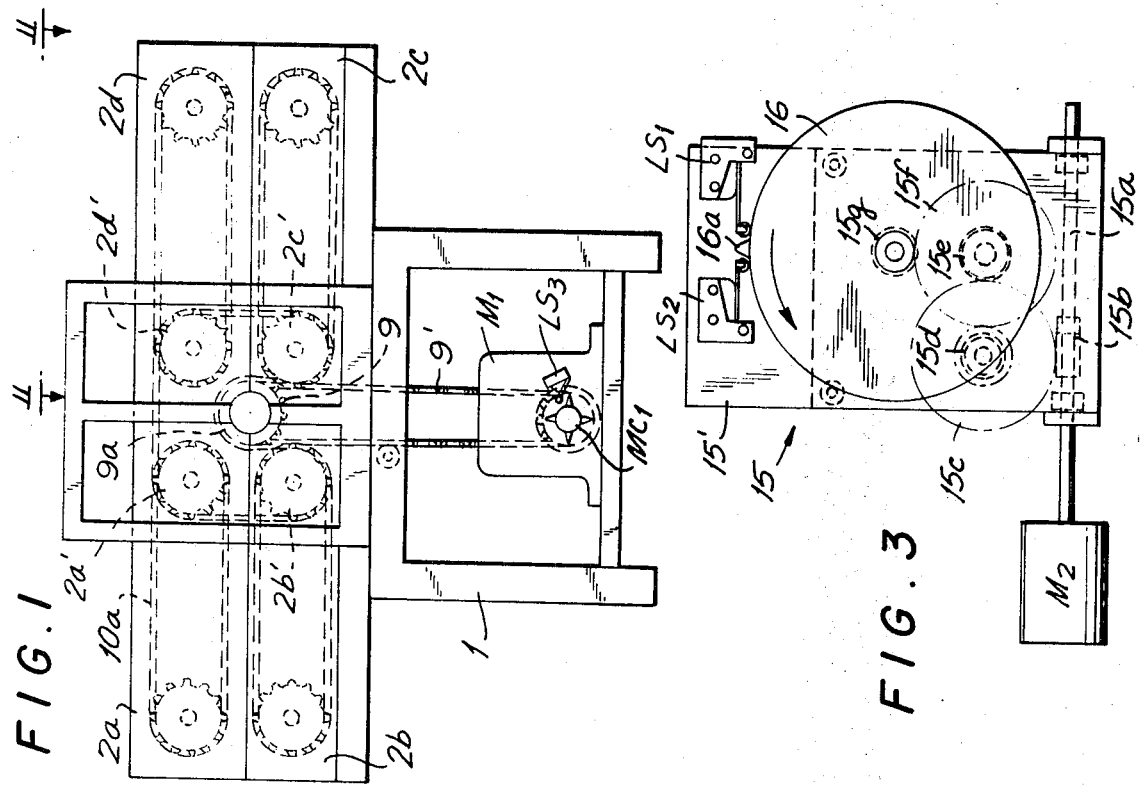
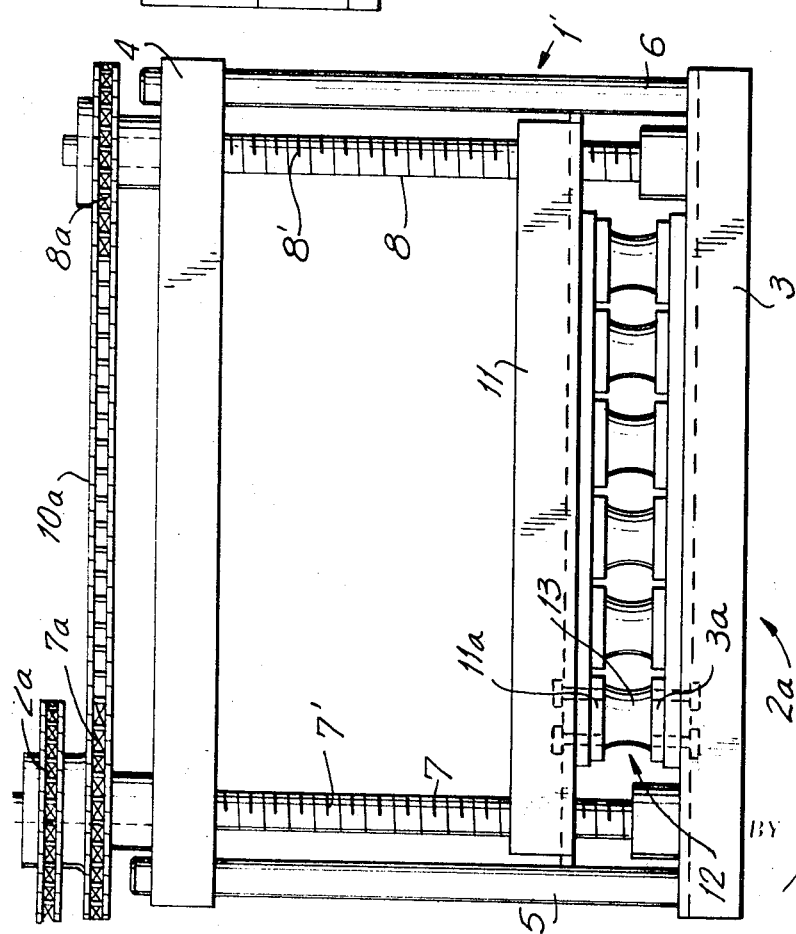
INVENTOR.
YALE H. SMILEY
BY
Henry Sternberg
ATTORNEY

INVENTOR.
YALE H. SMILEY

United States Patent Office 3,535,921
Patented Oct. 27, 1970

3,535,921
CYCLICAL CONTROL APPARATUS
Yale H. Smiley, Waterloo, Ontario, Canada, assignor to Uniroyal, Inc., New York, N.Y., a corporation of New Jersey
Filed Feb. 13, 1968, Ser. No. 705,205
Int. Cl. G01n 3/34
U.S. Cl. 73—91                                9 Claims

ABSTRACT OF THE DISCLOSURE

A testing device for automatically alternately urging a sample of elastomeric material in a direction to stretch and to compress the same, predetermined adjustable amounts respectively, and maintaining the sample in said alternately stretched and compressed conditions for predetermined adjustable lengths of time called dwell time. A timer and a counter cooperate with a drive motor to energize the latter during that portion only of each cycle of the timer determined by the counter setting. The latter setting corresponds to the amount of movement desired in each of the aforesaid directions and the difference between the time required for such movement in each direction and the total time of each cycle of the timer corresponds to the dwell time.

---

This invention, in general, relates to testing machines and, more particularly, pertains to machines useful in the testing of elastomer compositions under various conditions of stress. The testing apparatus according to the present invention is particularly adapted for the purpose of subjecting samples of mastic to cyclic deformation simulating as closely as possible the movements expected to take place in building structures. Various types of elastomer strips and caulk-type joint sealants may be tested under conditions simulating field conditions wherein such strips are employed to effect a seal in many types of expansion and compression joints.

Numerous elastomer materials, i.e., compressible and/or expansible materials of certain varieties are frequently used as sealing materials in concrete joints of highways, bridges and buildings. These compressible and/or extensible resilient strips are used to seal the expansion and contraction joints of the highway, bridge or building against intrusion of water, dirt and the like. The strips compress and expand as the expansion and contraction joint expands and contracts under variable climatic conditions.

The testing apparatus of the invention may be employed to test or screen various elastomer compositions in terms of their potential properties as sealing strips in joints of highways, buildings, airstrips, bridges, sidewalks and the like. With the apparatus of the invention the elastomer compositions can be subjected to conditions of maximum compression and/or tension anticipated in their ultimate use as highway, building, bridge, etc., seal materials at hot and cold temperatures, as well as to repetitive movements approximating the maximum number of such compressions and/or extensions during the useful life of such sealing material. In particular, but not exclusively, the device according to the present invention is intended to control machines for testing the resistance to fatigue of elastomeric sealing compositions.

The invention is described hereinbelow as applied to a machine for testing the resistance to fatigue. With a machine of this type it is possible to cyclically exert on the sample alternate compression and tension stresses of predetermined magnitude and to maintain the sample under the influence of each of such stresses for predetermined, readily adjustable, lengths of time.

U.S. Pat. No. 3,214,961 dated Nov. 2, 1965, the drawings and specification of which are hereby incorporated by reference, shows and describes an apparatus representative of known apparatus for testing elastomer sealants. Such known devices will hereinbelow be referred to as the "known testing apparatus." Thus, while machines for alternately subjecting an elastomer strip to compression and extension forces are known, such known devices do not teach a simple means for providing a readily adjustable, "dwell time," i.e., the time during each cycle in which the sample is maintained in expanded, compressed, partially expanded, partially compressed or normal condition.

The sequencing arrangement according to the present invention may be readily adapted, by one skilled in the art, to the known test apparatus to provide any desired, yet readily adjustable, combination of compression, extension, and dwell time characteristics.

It is an object of the present invention to provide an apparatus of the aforesaid type which is versatile and yet economical and simple to operate.

It is an additional object of the present invention to provide an apparatus of the above type which provides a predetermined, readily adjustable, length of dwell time during each cycle of operation.

It is a further object of the present invention to provide a sequencing system which is readily adaptable to and may be used with known testing apparatus.

Briefly, the test apparatus according to the present invention comprises a fixed block and a movable block which is movable toward and away from the fixed block. An elastomer strip is inserted and held between adjacent faces of the two blocks. The fixed block is fixedly but preferably removably attached to the frame of the machine. The movable block, on the other hand, is fixed but preferably removably attached to a movable element or carriage of the machine which, in turn, is reciprocally movable by power operated means toward and away from the fixed block at a slow rate of motion. In accordance with a preferred embodiment of the invention a timer and an automatically resettable impulse counter are electrically interconnected with a reversible sample actuating drive motor in such a manner as to cyclically reverse the direction of such motor for alternately compressing and extending the material under test predetermined distances while providing a dwell time of predetermined length during which the material is maintained in said conditions, respectively.

Additional objects will be apparent from the following description, reference being had to the accompanying drawings, in which:

FIG. 1 is a front elevational view illustrating diagrammatically a test apparatus according to an embodiment of the present invention;

FIG. 2 is a top plan view taken along line II—II in the direction of the arrows of FIG. 1 showing in enlarged scale a portion of the apparatus illustrated in FIG. 1;

FIG. 3 is a diagrammatic front elevational illustration of a portion of the timer mechanism according to the present invention.

Figure 4:
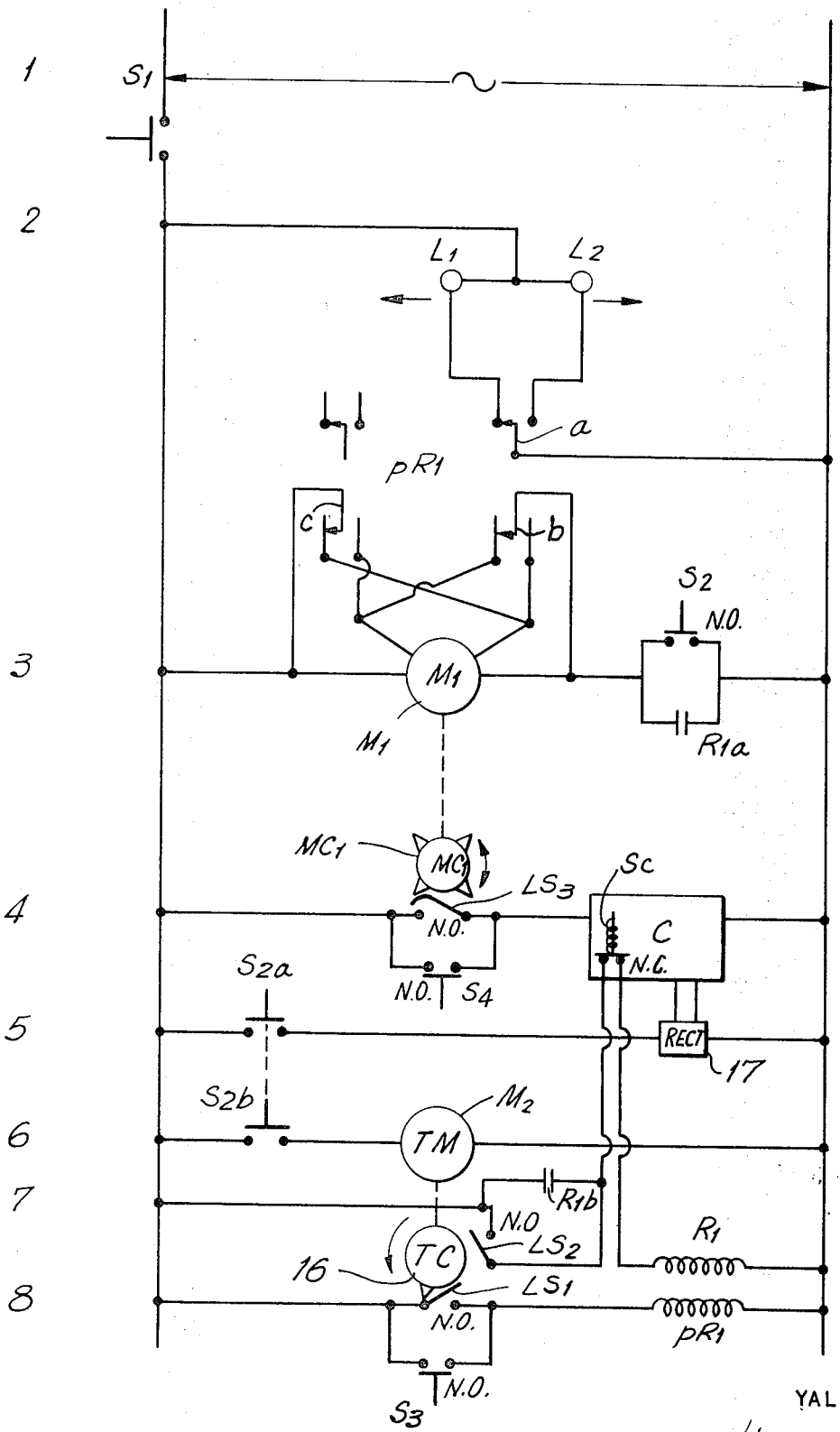
FIG. 4 is a simplified schematic of the electric control circuit according to an embodiment of the present invention.

Referring to the figures and first to FIG. 1 there is shown a frame 1 rigidly supporting four test tray units 2a, 2b, 2c and 2d.

Since the tray units 2a, 2b, 2c and 2d are identical except for the location of the drive sprockets 2a', 2b' and 2d' (FIG. 1), only one of the units, namely tray unit 2a, will be further described. Tray unit 2a comprises a subframe 1' which is separable from but may be rigidly connected, by any well known means, to the main frame 1 of the overall apparatus. Sub-frame 1', in turn, comprises a pair of parallel frame members 3, 4 rigidly secured to opposite ends, respectively, of a pair of parallel frame bars 5, 6. The bars 5, 6 are provided with inwardly facing grooves which form slide tracks for a movable carriage member 11.

In addition to the members 3, 4 and the parallel bars 5, 6 each tray unit further comprises a pair of rotatably mounted screw members 7, 8, parallel to the bars 5, 6. The screw members 7, 8 are rotatably journalled at their opposite ends in the members 3, 4, respectively, and have driven sprockets 7a, 8a affixed to corresponding ends thereof to so as to be rotatable therewith. The aforesaid drive sprocket 2a' is also fixed to screw member 7 adjacent the sprocket 7a.

A spur gear 9 is suitably rotatably mounted on frame 1 and is driven through a suitable drive chain 9' from a sprocket 9 located on the shaft of a reversible electric drive motor $M_1$ (FIG. 1) also suitably mounted on frame 1. Additional suitable drive chains drivingly connect the shaft of gear 9 via sprockets 2a', 2b', 2c' and 2d' with all of the driven sprockets and thus provide power to all of the screw members.

The movable carriage 11 has internally threaded bores threadedly engaging the machine screw threads 7' and 8' of the screw members 7, 8 so that carriage 11 moves axially with respect to the members 7, 8 in response to rotation of the latter.

When motor $M_1$ is actuated, the aforedescribed chain-sprocket drive causes the screw members 7 and 8 to rotate at equal, slow rates of rotation. As these screw members rotate, the threaded engagement thereof with the carriage 11 causes the latter to move in one direction or the other, depending upon the direction of rotation of the screw members 7, 8.

A plurality of test blocks 12 (FIG. 2) each comprising a pair of parallel end blocks 3a and 11a, respectively, having the sample elastomeric material 13 adhered to opposed faces thereof, may be conveniently connected to the stationary and movable members 3 and 11, respectively. Such connection may take the form, for example, of bolts passing through openings provided therefor in said stationary member 3 and movable carriage 11, respectively, and extending into, for example in threaded engagement with, the respective end block 3a, 11a of the sample unit 12. Alternatively the test block units and their connections to the movable and stationary portions of the apparatus may be similar to those of the known apparatus.

Connected to the output shaft of motor $M_1$ is a cam $MC_1$ having preferably four, equally spaced, circumferential protrusions arranged to actuate a microswitch $LS_3$ suitably positioned adjacent the periphery of the latter cam.

With each revolution of the output shaft of drive motor $M_1$, therefore, microswitch $LS_3$ will be actuated four times. It will be obvious that cam $MC_1$ need not be located on the output shaft of the drive motor but could alternatively be located anywhere along the sprocket chain drive system shown and described herein, including directly on the lead screws 7 and 8 themselves. Cam $MC_1$ constitutes part of a position indicating means for providing an indication of the amount of movement of carriage 11 i.e., of movable blocks 11a, with respect to stationary member 3, i.e., with respect to the fixed blocks 3a. Alternatively, such indication could be achieved with a linear potentiometer (not shown) mounted, for example, parallel to the bars 5, 6 and fixed to the frame while the wiper thereof is connected to the carriage 11. Where such a linear potentiometer or other position-responsive device is used, an alternate carriage drive means which may be substituted for the sprocket chain drive means shown, is a hyraulic fluid system (not shown) comprising, for example, a conventional hydraulic cylinder fixedly mounted on the machine frame with a movable piston therein. If the piston rod is connected to the movable block the piston rod may be moved in either direction at the desired linear rate in response to a hydraulic force applied against the appropriate side of the piston. Such arrangement is more fully described in the aforesaid patent of the known apparatus.

As is the case with the known apparatus, the test apparatus according to the present invention may be placed in a cold box, refrigerated room, heated chamber or other environmental chamber and operated therein as desired.

The motor $M_1$ is preferably provided with a suitable speed reducing device so that it may be geared down to provide a $\frac{1}{16}$ inch movement of the movable blocks 11a for each revolution of the motor output shaft and thus for each revolution of the cam $MC_1$. The cam $MC_1$ will, therefore, actuate limit switch $LS_3$, four times per revolution, i.e., per $\frac{1}{16}$ inch movement. In other words switch $LS_3$ will be activated once for each $\frac{1}{64}$ inch movement of the movable blocks 11a with respect to the fixed blocks 3a.

A signal generator means is provided in the form of a timer 15 including a timer drive motor $M_2$ (FIG. 3) suitably connected to a shaft 15a carrying a worm gear 15b which meshes in a well known manner with a pinion 15c which, also in well known manner, drives a cam member 16 through the meshing pinions 15d, 15e, 15f, and 15g. The arrangement is such that the aforesaid pinions may be readily removed and replaced with pinions of different size ratios forming a gear train having a different speed ratio, as is well known in the art. Alternate means for relatively slowly rotating the cam 16 at any desired predetermined rate of speed will be obvious to those skilled in the art.

Cam 16 is preferably provided with a single radial projection 16a at its outer periphery. Suitably fixed to the frame 15' of the timer 15 are a pair of microswitches $LS_1$ and $LS_2$ whose actuating arms are preferably provided with rollers in rolling contact with the circular periphery of the cam 16. As a result of counterclockwise rotation (FIG. 3) of cam 16 by motor $M_2$ the projection 16a will first engage and actuate switch $LS_1$ and, immediately thereafter, switch $LS_2$. Thereafter, cam 16 completes its rotational movement which is preferably in the order of one-half to six hours, until the switch $LS_1$ is actuated once more. As previously noted, a simple gear train selection can provide a desired cycle time anywhere in the aforesaid preferred range, or in any other desired range. One full rotation of the timer cam 16 represents a "cycle" as used herein.

While other ranges of movement of the movable block 11a with respect to fixed block 3a are of course possible, it is preferred, for the stated purposes of the present apparatus, to provide movement of movable block 11a in the range of $\frac{1}{32}$ inch to 1 inch. With the construction illustrated in FIG. 1, samples having several different configurations can be tested simultaneously in groupings of 6, i.e., 24 samples can readily be tested at the same time.

There is thus provided, in accordance with the present invention, a fully adjustable test apparatus for cyclically alternately urging samples of elastomeric material in directions to compress and to extend the same, respectively.

The adjustment capability of the apparatus is such that not only the amount of compression and/or extension may be varied but also the number of cycles per unit time as well as the dwell time itself, i.e., the length of time the samples are maintained in either elongated or compressed condition, as the case may be, per cycle.

Timer 15 is arranged to provide signals at equal intervals determined by the speed of the timer. The duration between a pair of consecutive drive-actuating signals, i.e., the signals generated by consecutive actuation of the drive control switch $LS_2$, representing the "cycle" of the timer.

The main drive means, including drive motor $M_1$, provides movement in forward and reverse directions to respectively act on the sample in directions to compress and extend the same, respectively.

Each time a signal is developed by the actuation of polarity control switch $LS_1$ of timer means 15, the polarity of drive motor $M_1$ is reversed so that the motor $M_1$ will be prepared to move next in a direction opposite to the direction in which it rotated during the previous cycle, e.g., to compress a previously extended sample, to decompress or extend a sample which was compressed in the previous cycle, etc. Thus, during consecutive cycles of the timer, the drive means will impart to the movable blocks 11a of the samples, sequential movement in alternate directions. It will be seen that after two complete revolutions of the cam 16, i.e., two complete cycles of the timer 15, the samples have been returned to their initial condition.

A second signal developed by the timer means, namely by actuation of the microswitch $LS_2$ a short time after each actuation of switch $LS_1$, energizes drive motor $M_1$ to begin rotation of the lead screws 7 and 8 and thus to begin movement of the movable blocks 11a with respect to stationary block 3a, in the direction determined in the above noted manner.

An adjustable, automatically resetting, counter C is arranged to receive impulses from the microswitch $LS_3$ actuated by rotation of cam $MC_1$ of the drive means. The number of such impulses is indicative of the amount of movement which the drive means has imparted to the movable sample block 11a, during a particular cycle and irrespective of the direction of movement during such cycle. The counter C may be of a type readily available commercially such as, for example, the "Cycle-Flex-Counter, No. HZ 150A6," a product of the E. W. Bliss Company, 736 Federal St., Davenport, Iowa. The counter C counts the impulses generated by switch $LS_3$ during movement by the drive means in any one direction. When this count equals that initially set into the counter C by the operator, the counter terminates further movement of the drive motor $M_1$, maintaining the movable blocks 11a stationary during the remainder of the timer cycle then in progress. In other words, the drive motor $M_1$ will be de-energized and will remain de-energized until completion of such timer cycle, i.e., until the next succeeding signal is received from the timer switch $LS_2$. Meanwhile, also, the counter C is automatically reset to the initial operator-set value thereof in preparation for the next timer cycle.

Thus, during the remaining part of the timer cycle, i.e., after the counter has terminated movement of blocks 11a, e.g., after compressing or stretching the sample the desired amount, as the case may be, but prior to receipt of the next succeeding signal from timer switch $LS_2$, the sample remains, for the duration of the "dwell" time, in the compressed, the unstressed, or the extended state, as the case may be, into which it was last driven by the drive means.

When the timer cam projection 16a actuates timer switch $LS_1$, after nearly completing a cycle, the polarity of motor $M_1$ is reversed, as previously noted, so as to prepare the drive means for movement in a direction opposite to the previous direction of movement. When thereafter actuated by timer switch $LS_2$, the motor $M_1$ proceeds to drive movable blocks 11a in the prescribed direction until terminated by the action of the resettable counter C again reaching its predetermined operator-set count. Thereafter the "dwell" time of that cycle begins and does not end until switch $LS_2$ is once more actuated.

Thus, it will be seen that the timer means 15 may be set for cycles of predetermined overall duration while the counter C may be set by the operator for a predetermined amount of sample elongation and/or compression. As noted, during consecutive cycles of the timer means 15, the direction of application of forces to the sample is automatically reversed so that the sample may be subjected alternately to compression and elongation or to varying amounts of compression or elongation, as may be desired. The difference between the length of time required to compress or elongate the sample, as determined by the time required before the impulses generated by switch $LS_3$ equal the operator setting of counter C, and the duration of the timer cycle, i.e., the time between consecutive signals provided by actuation of timer switch $LS_2$, equals the "dwell time," i.e., the time during which the samples remain in the compressed, stretched, or unstressed condition, as the case may be.

FIG. 4 shows the preferred electric circuit means for accomplishing the above. Referring to FIG. 4 there is provided a source of alternating current (line 1) and a master control switch $S_1$ in series therewith. A pair of indicating lamps $L_1$ and $L_2$ (line 2) are provided for indicating the direction of movement of the movable member 11, i.e., whether the latter is actuated in a direction to elongate or in a direction to compress a sample material 13 secured in the apparatus. A polarized relay $PR_1$ is provided for reversing the direction of such movement.

As used herein "polarized relay" refers to commercially available relays of the type which are placed in activated condition in response to a first momentary signal and which remain in said activated condition until the next succeeding momentary signal when they once again are deactivated, remaining in such deactivated condition until the next following momentary signal is received. Alternatively, a "latching" relay may be used as will be readily apparent to those skilled in the art. Relay $PR_1$ is preferably a four-pole double-throw relay having a first pole a completing the circuit of either one or the other of the signal lamps $L_1$, $L_2$ depending on the position of the relay; and second and third poles b, and c, respectively, completing the circuit of motor $M_1$ for reversing the polarity of the latter in dependence on the position of relay $PR_1$, i.e., whether the latter relay is actuated or not. A manual switch $S_2$ is connected in series with drive motor $M_1$ for permitting manual operation of the motor when desired. A second relay, preferably a double-pole double-throw relay $R_1$ has one of its normally open contacts in parallel with switch $S_2$ so as to close the motor circuit, for actuating motor $M_1$, whenever relay $R_1$ is actuated.

Microswitch $LS_3$ is connected in series with counter C for providing impulses to the counter corresponding to the rotation of cam $MC_1$ by motor $M_1$ (line 4).

Counter C requires direct current energization and is therefore powered by a commercially available rectifier 17 (line 5) which is across the line in series with normally open switch $S_2a$.

The timer motor $M_2$ is across the line in series with normally open switch $S_2b$ which may be mechanically linked to switch $S_2a$ (line 6). The normally open contacts of switch $LS_2$ are in series with the coil of relay $R_1$ and with the normally closed contacts of a switch $S_c$ (line 4) controlled by counter C in well known manner. A normally open contact of relay $R_1$ is connected in parallel with switch $LS_2$ so as to provide a holding circuit for relay $R_1$, as is well known in the art.

The normally open contacts of switch $LS_1$ are in series with the coil of polarized relay $PR_1$ (line 8). A manual switch $S_3$ is provided across the terminals of switch $LS_1$ so as to provide a manual override when it is desired to energize relay $PR_1$ manually.

Counter C is of such construction that a predetermined number may be readily preset therein by an operator. On receiving impulses resulting from the actuation of switch $LS_3$ by the projections on cam $MC_1$, the counter C subtracts these received impulses from the preset number until zero is reached. At that time counter C acts to open normally closed switch $S_c$, thus opening the circuit of relay coil $R_1$, deenergizing the latter relay so as to, in turn, deenergize drive motor $M_1$. Counter C comprises an automatic reset mechanism which automatically returns the counter setting to the preset number when the counter reaches the aforesaid "zero" condition at which the relay $R_1$ is deenergized. The counter is thus immediately ready for the next counting operation during which cam $MC_1$ rotates in reverse direction.

It will be obvious to those skilled in the art that by proper manipulation of the motor jog switch $S_2$, the drive direction control switch $S_3$, and the timer jog switch $S_4$ an operator can obtain any desired cyclic combination of compression and extension movement of sample material 13. For example, the sample 13 can be initially compressed ½ inch, then driven in the opposite direction, past the initial unstressed condition thereof, to be elongated ½ inch, and so on. Thus, with the proper initial settings of the apparatus, any desired combination of compression and elongation can be achieved during a pair of consecutive cycles.

A typical operation follows: Samples 13, fixed between blocks 3a and 11a, have been placed into position between the movable and fixed members 11 and 3, respectively. The timer 15 gear train has been arranged for a one-hour cycle, i.e., a single revolution of the projection 16a of cam 16 requires one hour. The unit is energized by manual actuation of switch $S_1$ which, with the various contacts and relays in the condition indicated in FIG. 4, causes the lamp $L_1$ (compression direction) to light. Next, switch $S_2a$ is closed to energize the counter C with direct current. Now switch $S_2b$ is depressed to bring the timer cam 16 into the desired position (FIG. 4) where it is just about to engage and actuate switch $LS_1$. Upon actuation of switch $LS_1$, relay $PR_1$ becomes energized resulting in a shifting of the contacts thereof from the position illustrated in FIG. 4 to the opposite position thereof. Lamp $L_2$, therefore, becomes illuminated indicating a drive direction in a direction of elongation of the sample 13. Similarly, the polarity of motor $M_1$ is changed to that required for driving in the direction of "elongation" of the sample pieces. Continued movement of the timer cam 16 results in actuation of switch $LS_2$, energizing relay $R_1$ which thereupon closes the contacts $R_1a$ (line 3) and $R_1b$ (line 7). The closing of contact $R_1a$, of course, energizes the drive motor $M_1$ which immediately begins to drive all of the lead screws 7, 8 in a direction to move member 11 away from stationary member 3. When motor $M_1$ has driven the cam $MC_1$ through the desired number of revolutions, or parts thereof, as determined by the number of impulses produced by switch $LS_3$, the subtracting counter C reaches "zero" and opens the normally closed switch $S_c$, thus opening the circuit of relay $R_1$. It will be noted that, as a result of the holding contacts $R_1b$ thereof, relay $R_1$ has remained energized even after cam projection 16a moved beyond, and therefore permitted opening of, switch $LS_2$. These holding contacts, of course, close and remain closed even after opening of switch $LS_2$, until the circuit is interrupted by the counter C opening switch $S_c$, as previously noted.

Meanwhile, timer motor $M_2$ continues to rotate timer cam 16, at least for the remainder of the one hour cycle time, and preferably for any desired number of additional cycles thereafter. Motor $M_1$ is, of course, deenergized as soon as the circuit of relay coil $R_1$ is interrupted resulting in opening of contact $R_1a$. The sample 13 is thus maintained in elongated condition for the remainder of the cycle.

When, at the completion of the cycle, the projection 16a (moving counterclockwise) once again actuates the contact of switch $LS_1$, the latter again impulses the polarized relay $PR_1$ to change the condition thereof back, once more, to the condition illustrated in FIG. 4. The lamp $L_1$ lights to now indicate a movement in a direction to "compress" the sample 13, and the polarity of motor $M_1$ is changed to that which provides for movement in such "compress" direction. Shortly thereafter (FIG. 3), the projection 16a actuates switch $LS_2$ to once more energize relay $R_1$, which, as noted above, remains energized through the holding circuit provided by its own contact $R_1b$. With the contact $R_1a$ thus in closed condition, drive means $M_1$ now begins driving the lead screws 7, 8 and the cam $MC_1$ in the direction to "compress" the sample 13, i.e., moving the member 11 toward the stationary member 3. When the number of impulses transmitted to the counter C, from switch $LS_3$, reaches the preset number, the circuit of relay $R_1$ will be interrupted by opening of switch $S_c$, stopping the motor $M_1$. The sample 13 will now once again be in its initial, unstressed, condition and will remain in such condition while the timer motor drives the cam 16 through the remainder of the cycle, as previously described.

In order to simplify the drawings such items as fuses, safety switches and other similar devices are not shown or described. Such devices are well known and it will be obvious to those skilled in the art exactly how they should be employed with the construction according to the present invention.

In the description of the operating cycle herein, reference has been made at times to subsidiary devices such as reversible electric motors, potentiometers, microswitches, relays, polarized relays, latching relays, rectifiers, and pulsecounters, etc., all of which are conventional items of hardware and are not, therefore, described in detail in the drawings.

While a particular embodiment of this invention has been shown and described, it will be obvious to those skilled in the art that various changes and modifications may be made without departing from this invention in its broader aspects, and it is, therefore, intended in the appended claims, to cover all such changes and modifications as fall within the true spirit and scope of this invention.

What is claimed as new and desired to be protected by Letters Patent is:

1. In a testing apparatus, particularly for cyclically operating on deformable materials in directions to compress and to extend the latter respectively, in combination:
   a driven means including a driven member and means for engaging therewith one end of a test specimen of deformable material the other end of which is maintained fixed;
   reversible drive means operatively connected to said driven member;
   signal generator means for providing a signal at predetermined intervals of time;
   operating means operatively connecting said signal generator means and said reversible drive means for initiating actuation of said drive means in alternately opposite directions in response to consecutive ones of said signals;
   and position responsive means controlling said drive means for automatically terminating actuation of the latter, during each of said intervals, in response to said drive means driving said driven member to a predetermined position thereof, said predetermined position being chosen such that the time required by said driven member to reach the same is less than the duration of the corresponding one of said predetermined intervals, whereby said driven member remains at rest for a predetermined period prior to each movement in the opposite direction.

2. A test apparatus according to claim 1, wherein said intervals of time between consecutive signals are equal.

3. A test apparatus according to claim 1, wherein said signal means comprises electric signal generator means adapted to produce an electric signal at the termination of each of said predetermined intervals of time.

4. A test apparatus according to claim 1 wherein said operating means comprises an electric circuit, said signal means comprises a timer connected in said circuit and said drive means comprises a reversible electric motor also connected in said circuit.

5. A test apparatus according to claim 1, wherein said position responsive means comprises: an automatically resettable counter, a pulse generator means for providing a series of pulses indicative of the amount of movement of said driven means, and circuit means connecting said pulse generator means with said counter whereby said counter will terminate actuation of said drive means in response to receiving a predetermined number of pulses, said counter being adapted to be automatically reset after receiving said predetermined number of pulses.

6. A test apparatus according to claim 5, wherein said counter is adjustable so as to provide for different repetitive amounts of movement of said driven member.

7. A test apparatus according to claim 1 wherein said signal means comprises an adjustable timer for providing periodically repetitive electrical impulses at adjustable predetermined intervals.

8. In a testing machine having a frame, a first stationary block mounted on said frame, means on said frame movably mounting a second block, and means for slowly reciprocating said second movable block toward and away from said first stationary block in direction respectively to compress and extend an elastomer sample held between adjacent faces of said blocks, said last mentioned means comprising:
   reversible drive means operatively connected to said second block;
   signal generator means for providing a signal at predetermined intervals of time;
   operating means operatively connecting said signal generator means and said reversible drive means, for initiating actuation of said drive means in opposite directions in response to consecutive ones of said signals;
   and position responsive means controlling said drive means for automatically terminating actuation of the latter in response to said drive means driving said second block from one to the other of a pair of predetermined positions thereof, said predetermined intervals being chosen such that each substantially exceeds the time required by said second block to move between said pair of predetermined positions thereof, whereby said second block remains at rest in each of said predetermined positions thereof for a substantial period of time prior to each movement thereof in the opposite direction.

9. In a control apparatus, particularly for cyclically controlling movements in opposite directions, respectively, in combination:
   a driven member;
   reversible drive means operatively connected to said driven member;
   signal generator means for providing an electrical signal at predetermined equal intervals of time;
   electric circuit means operatively connecting said signal generator means and said reversible drive means for initiating actuation of said drive means in alternately opposite directions in response to consecutive ones of said signals;
   and position responsive means cooperating with said driven member for sensing the position of the latter, said position responsive means being connected in circuit with said drive means for automatically terminating actuation of the latter, in the interim between the beginning and ending of each of said intervals, in response to said drive means driving said driven member to a predetermined position thereof;
   said predetermined position being chosen such that the time required by said driven member to reach the same is less than the duration of the corresponding one of said predetermined intervals, whereby said driven member remains at rest for a predetermined period of time prior to each movement in the opposite direction.

References Cited

UNITED STATES PATENTS

| 1,978,947 | 10/1934 | Johanson et al. | 318—281 X |
| 3,009,354 | 11/1961 | Schwaninger | 73—90 |
| 3,083,566 | 4/1963 | Huyser | 73—90 |

JERRY W. MYRACLE, Primary Examiner

U.S. Cl. X.R.

73—92